United States Patent
Gutzmann

(10) Patent No.: US 6,327,347 B1
(45) Date of Patent: Dec. 4, 2001

(54) CALLING PARTY IDENTIFICATION AUTHENTICATION AND ROUTING IN RESPONSE THERETO

(75) Inventor: Douglas Brian Gutzmann, Calgary (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/209,681

(22) Filed: Dec. 11, 1998

(51) Int. Cl.[7] .................................................. H04M 1/64
(52) U.S. Cl. ............................... 379/88.02; 379/88.2
(58) Field of Search ........................... 379/88.01, 88.02, 379/88.2, 88.21, 127

(56) References Cited

U.S. PATENT DOCUMENTS

| | | | |
|---|---|---|---|
| 3,787,626 | 1/1974 | Subieta | 179/5.5 |
| 5,263,084 | 11/1993 | Chaput et al. | 379/215 |
| 5,274,695 | * 12/1993 | Green | 379/88.02 |
| 5,289,542 | 2/1994 | Kessler | 379/142 |
| 5,521,966 | 5/1996 | Friedes et al. | 379/91 |
| 5,608,784 | * 3/1997 | Miller | 379/88.02 |
| 5,832,072 | 11/1998 | Rozenblit | 379/142 |
| 5,903,636 | 5/1999 | Malik | 379/142 |
| 5,982,866 | 11/1999 | Kowalski | 379/142 |
| 6,012,049 | 1/2000 | Kawan | 379/90.01 |

OTHER PUBLICATIONS

Book Title: Telecommunications Primer: Signals, Building Blocks and Networks by E. Bryan Carne. Publisher: Prentice Hall PTR, New Jersey, USA. Copyright 1995. Chapter 9, p. 275.

\* cited by examiner

*Primary Examiner*—Creighton Smith

(57) ABSTRACT

A method and system for indicating authentication of the identity of a calling party based on an intrinsic property of the calling party is disclosed. Representations of intrinsic properties of potential calling parties are gathered and stored as reference representations for use in comparisons with later acquired representations. When a later acquired representation matches an earlier acquired representation, authentication of the calling party is deemed to have occurred. Speedier authentication may be provided by using calling line identification information in conjunction with representation matches. When authentication occurs, a signal is produced to indicate same and such signal may be used in uniquely identifying the calling party or in routing the call, for example.

39 Claims, 4 Drawing Sheets

SUBSCRIBER DATABASE RECORD

CALLING PARTY DATABASE RECORD

CALLING PARTY IDENTIFICATION AUTHENTICATION AND ROUTING IN RESPONSE THERETO

BACKGROUND OF THE INVENTION

1. Field of the Invention

This invention relates to a method and system for indicating authentication of the identity of a calling party based on an intrinsic property of the calling party. More particularly, it relates to providing calling party identification in addition to, or instead of, calling line identification, and routing calls based on such information and/or accessing caller information for display or other purposes.

2. Description of Related Art

The use of calling line identification information to identify a calling party has found wide use in public switched telephony. However, calling line identification only provides a called party with the identity of the telephone line on which the call is initiated and the name of the registered subscriber of such line. As a household or business will often have only a single telephone line, or fewer telephone lines than people, multiple users of the same telephone line are not uniquely identified to the parties they call. Hence, calling line identification information is incomplete and unreliable with respect to identification of a specific calling party.

Identifying a specific calling party is commonly done after a telephone call is established. The called party or automated equipment on the called party's line, as in the case of a bank, may request the calling party to identify himself through the use of a personal identification number or functionally equivalent construct. The called party may then respond appropriately based on the identity indicated by the calling party. This however, requires that the calling party remember a unique identification number. Experience has shown that such numbers are easily forgotten or may be shared with other parties, such as spouses, for example. Consequently, the use of passwords to uniquely identify a calling party is not completely reliable and is vulnerable to misuse.

What would be desirable therefore is an efficient, conclusive and economical way of providing a called party with calling party information, such as calling party identity, unique to the person actually making the call and based upon nontransferable characteristics of the calling party.

SUMMARY OF THE INVENTION

The present invention addresses the above need by providing a method and system for indicating authentication of the identity of a calling party based on an intrinsic property of the calling party. Representations of intrinsic properties of potential calling parties are gathered and stored as reference representations for use in comparisons with later acquired representations. When a later acquired representation matches an earlier acquired representation, authentication of the calling party is deemed to have occurred. Speedier authentication may be provided by using calling line identification information in conjunction with representation matches. When authentication occurs, a signal is produced to indicate same and such signal may be used in uniquely identifying the calling party or in routing the call, for example.

In accordance with one aspect of the invention, there is provided a method of indicating authentication of the identity of a calling party. The method involves detecting an intrinsic property of the calling party, authenticating the identity of the calling party based on the intrinsic property and providing a signal to the called party in response to authentication of the calling party's identity. Such intrinsic properties may include but are not limited to voice profile, image, fingerprints, and DNA.

The system and method of calling party authentication can be performed at a central location such as a telephone company central office. In this way, a telephone service provider can maintain one large database of intrinsic properties to which service subscribers have access. Such a database is more comprehensive and therefore more effective than a database any single subscriber could practically create by itself. Furthermore, by providing a common speaker recognition service, common to a plurality of subscribers, the high cost of providing such services can be distributed among a plurality of users. Effectively, the central office acts as an intermediary placed between the calling party and the called party. In this way, the intermediary performs the authentication and sends an authentication signal to the called party before a communication link between the calling party and the called party is established.

Preferably, the authentication signal includes calling party information. This information may be used by the called party to automatically route the call within the called party's system or to provide improved customer service. Such improved customer service may include automatically generating and filling in a customer database record.

The authentication signal may also be used to implement a password-free security system. In the absence of an authenticated identity, the intermediary may refuse to complete the call or the called party could refuse to accept the call. Additionally, in the event of a valid authentication signal and unique calling party identity, the called party's equipment might permit access but only to the extent permitted for that particular person.

The apparatus may include an automatic call direction system located inside a central office or in a PBX system, for example, for directing a call in response to authentication of the calling party or in response to the authentication signal.

The apparatus may also include an automatic system for retrieving a customer database file and for displaying the contents of such file for the called party to view.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
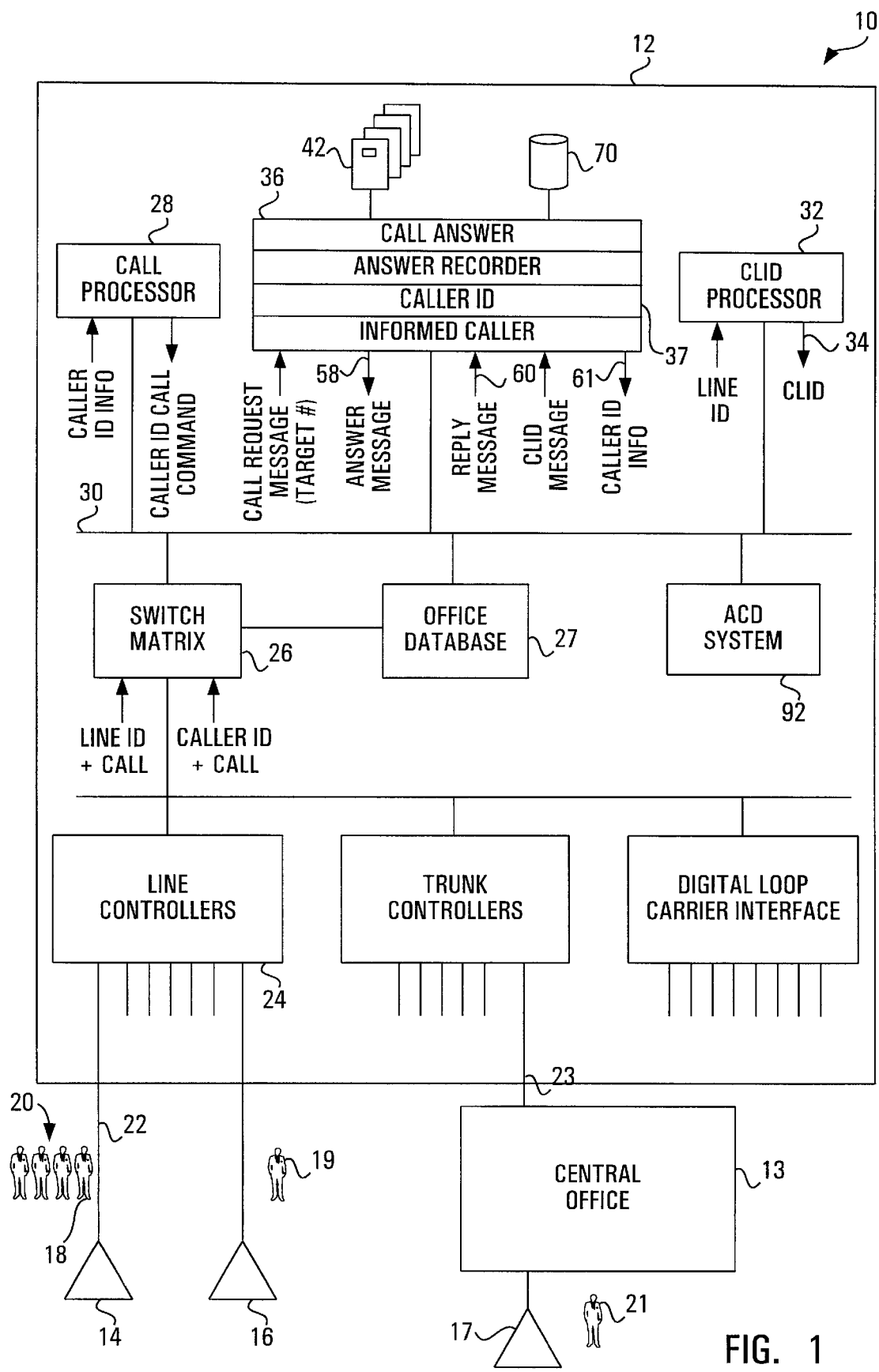
FIG. 1 is a block diagram of a system for providing calling party identification according to a first embodiment of the invention.

Referring to FIG. 1, a system for indicating authentication of the identity of a calling party based on an intrinsic property of the calling party is shown generally at 10.

In this embodiment the system includes a central office 12, calling party customer premises equipment 14 and called party customer premises equipment 16. The calling party customer premises equipment 14 is operated by a first calling party 18. It will be appreciated however that a plurality of calling parties shown generally at 20, including the first calling party 18, may use the same customer premises equipment 14. Effectively, the invention provides a way of identifying to the called party customer premises equipment 16, which of the calling parties from the plurality of calling parties 20 is making a call to the called party customer premises equipment 16, using the calling party equipment 14. In other words, authentication of the calling party is provided.

To this end, the first calling party 18, for example, dials on the calling party customer premises equipment 14, the telephone number of the called party customer premises equipment 16.

The calling party customer premises equipment 14 is connected to the central office 12 through a telephone line 22 which is terminated at a line controller 24. The line controller 24 detects the calling party customer premises equipment 14 going off hook and stores an equipment number of the telephone line 22 of the calling party customer premises equipment in a service request buffer (not shown). The contents of this service request buffer are passed through a switch matrix 26 in the central office 12 to a call processor 28 which uses the contents of the service request buffer to search an office database 27 to identify the characteristics of the calling party customer premises equipment including directory number, dial pulse or touch tone signalling, etc. The call processor 28 then creates a call record in temporary storage (not shown), locates an idle digit receiver (not shown) that matches the signalling characteristics of the calling party customer premises equipment 14 and finds a path through the switch matrix 26 between the telephone line 22 of the calling party and the digit receiver and connects them. This sequence is followed by return of dial tone to the calling party customer premises equipment 14 and initiation of a digit scan program that scans the digit receiver for dialled digits and collects them in a digit buffer (not shown). A digit analysis program is then run on the contents of the digit buffer to identify and validate the called numbers. When satisfied that the number has been received correctly and that it is a valid directory number, a caller ID command message is sent from the call processor 28, on a common messaging bus 30 to a calling line identification processor 32. The calling line identification processor 32 returns a calling line identification information message 34 on the common messaging bus 30 which is received at an authenticating processor 36. This calling line identification information is held in a caller ID buffer 37. Thus the calling line identification processor acts as a calling line information detector for detecting calling line identification information of the calling party.

At the same time, the valid directory number dialled at the calling party customer premises equipment 14 is included in a message sent from the call processor 28 to the authenticating processor 36 as a call request message including a target directory number. The authenticating processor 36 receives the call request message and runs a caller identification (ID) routine shown generally at 38 in FIG. 2A.

Figure 2A:
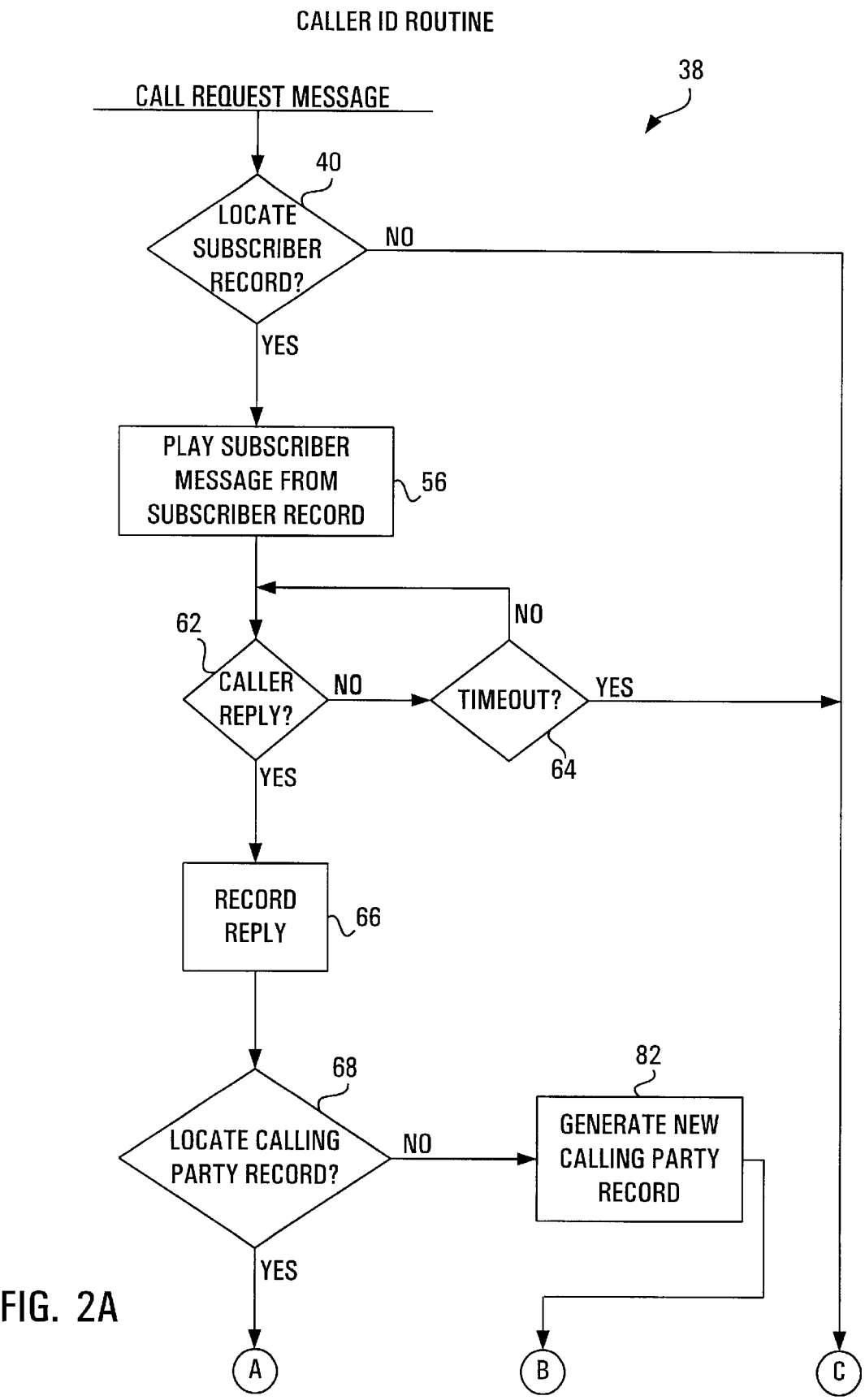
FIGS. 2A and 2B are first and second parts respectively, of a flowchart of a calling party identification routine run on an authenticating processor of the system shown in FIG. 1.
Figure 3:
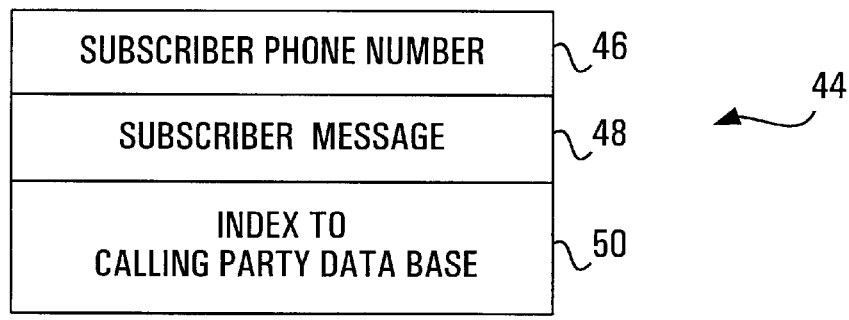
FIG. 3 is a representative subscriber database record accessible by the authenticating processor.

Referring to FIGS. 1 and 2A, the caller ID routine 38 begins with a first block 40 which directs the authenticating processor 36 to locate a subscriber record in a subscriber database shown generally at 42. The subscriber database holds subscriber records corresponding to called parties who subscribe to the calling party identification service. Referring to FIG. 3, a representative subscriber database record is shown generally at 44 and includes a called number field 46, a subscriber message field 48 including a pre-recorded message associated with the subscriber, and an index field 50 for storing an index to a calling party database. The subscriber database 42 could be organized and searched using the called number field 46 as an index, for example.

Referring back to FIGS. 1 and 2A, if no corresponding subscriber database record 44 is found, the called party is not a calling party identification service subscriber and the caller ID routine is terminated. The authenticating processor 36 is directed, at block 52 in FIGS. 1 and 2B, to send a message to the call processor 28 indicating that it may complete the call with no authentication signal being provided although calling line identification information may be provided.

Referring back to FIGS. 2A and 3, if a subscriber database record 44 is found in the subscriber database 42, the authenticating processor 36 functions as an interceptor to intercept the establishment of a communications link between the calling party and the called party and instead establishes communications between the calling party and itself. Thus, communications are established between the first calling party 18 and an intermediary between the first calling party 18 and the called party, the intermediary being the authenticating processor 36. At this point, block 54 directs the authenticating processor 36 to function as a prompter by retrieving the contents of the subscriber message field 48 and sending a subscriber message 58 on the common messaging bus 30, through the switch matrix 26 and to a line controller 24 such that the message is annunciated at the calling party customer premises equipment 14. The subscriber message 58 prompts the first calling party 18 to provide an intrinsic property of itself. The subscriber message 58 may be audible or visual or any other form which elicits a response from the first calling party 18. In this embodiment for example, the subscriber message 58 is audible and thus the subscriber message 58 is converted into an audible signal audible to the first calling party 18.

In response to hearing the subscriber message 58, the first calling party 18, responds with a submission of something containing an intrinsic property of the calling party, in this embodiment an audible utterance which may be the first calling party's name or other word or phrase for example. Such response is preferably audible but could alternatively be a fingerprint imprint, facial image, or any other submission which includes an intrinsic property of the first calling party 18. In this embodiment, where an audible response is obtained from the first calling party 18, the intrinsic feature of the audible response is a voice profile of the utterance, more particularly the frequency spectrum and smoothness characteristics of the calling party's voice utterance.

The calling party's utterance is received by the line controller 24 which provides a reply message 60, representing the calling party's utterance, to the authenticating processor 36. In this embodiment therefore, the line controller acts as a receiver for detecting a voice utterance of the calling party. Referring back to FIG. 2A, the authenticating processor functions as a recorder by recording the calling party's reply message 60 into temporary storage under the direction of block 66.

Referring back to FIGS. 1 and 2A, during the period between the time the subscriber message 58 is transmitted to the first calling party 18 and the calling party's reply message 60 is received, block 62 directs the authenticating processor 36 to wait for the calling party's reply and block 64 directs the authenticating processor 36 to wait no longer than a predetermined period. Such period may be ten seconds, for example. If the first calling party 18 does not reply within ten seconds, the authenticating processor 36 is directed to issue a complete call message by block 52 and the call processor 28 completes the call. In this circumstance, no authentication signal will be transmitted, only calling line identification information.

Figure 4:
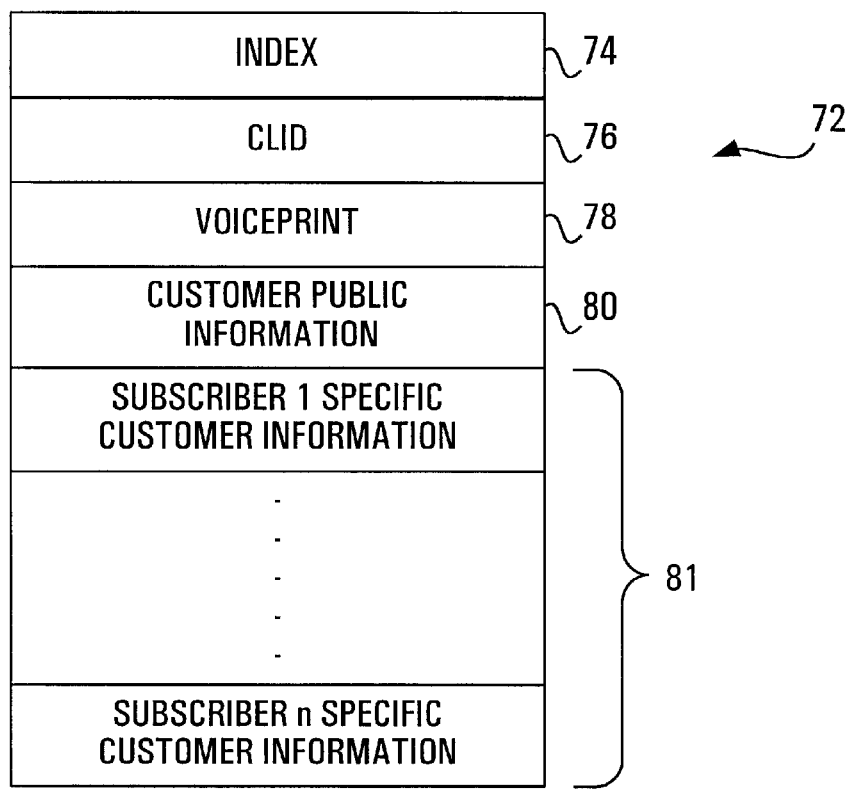
FIG. 4 is a representative calling party database record accessible by the authenticating processor.

Block 68 then directs the authenticating processor 36 to locate a calling party database record by searching in a second, calling party information database 70 of calling party information. Referring to FIG. 4, a representative calling party database record is shown generally at 72 and includes index fields 74 associated with respective subscribers of the service, a calling line identification field 76, a voice print field 78, a customer public information field 80 and a plurality of subscriber-specific customer information fields 81 related to corresponding index fields 74. The voice print field 78 holds a representative previously acquired voice print of the calling party and thus, the information database includes a database of intrinsic property profiles, including voice profiles, associated with respective calling party information.

Generally, the search of the calling party database could be performed by using any of the search algorithms known in the art. Without limiting the generality of the search, the database could be searched linearly i.e. comparing each record consecutively or searched by using the calling line identification number as an index, or by having the calling party enter a unique code number as an index before making the identifying utterance, or by speech recognition, for example. Or any combination of these search methods or others could be employed.

Preferably, however, as in this embodiment the authenticating processor 36 is programmed to act as a speech recognizer for recognizing speech provided by the calling party to attempt to locate possible records. In addition, calling line identification information is used on a pass through the information database to narrow the search to the most likely records. As a result of these searches, a few possible records may be located, or more generally, information relating to the calling party is located in response to speech recognized by the speech recognizer and calling line identification information. If further narrowing is desired, the authenticating processor may search the records for a match with a password provided by the calling party.

Referring back to FIG. 2A, if no calling party record is located in the search, block 82 directs the authenticating processor 36 to create a new calling party record wherein the index field is copied from the index field 50 of the subscriber database record 44 shown in FIG. 3, the calling line identification field 76 is copied from the caller ID buffer 37 and the voice print field 78 is copied from the reply message 60. The office database 27 provides the contents of the customer public information field 80 and the subscriber-specific customer information field 81 associated with the subscriber indicated by the index field 50 is filled at a later time by the called party/subscriber.

Figure 2B:
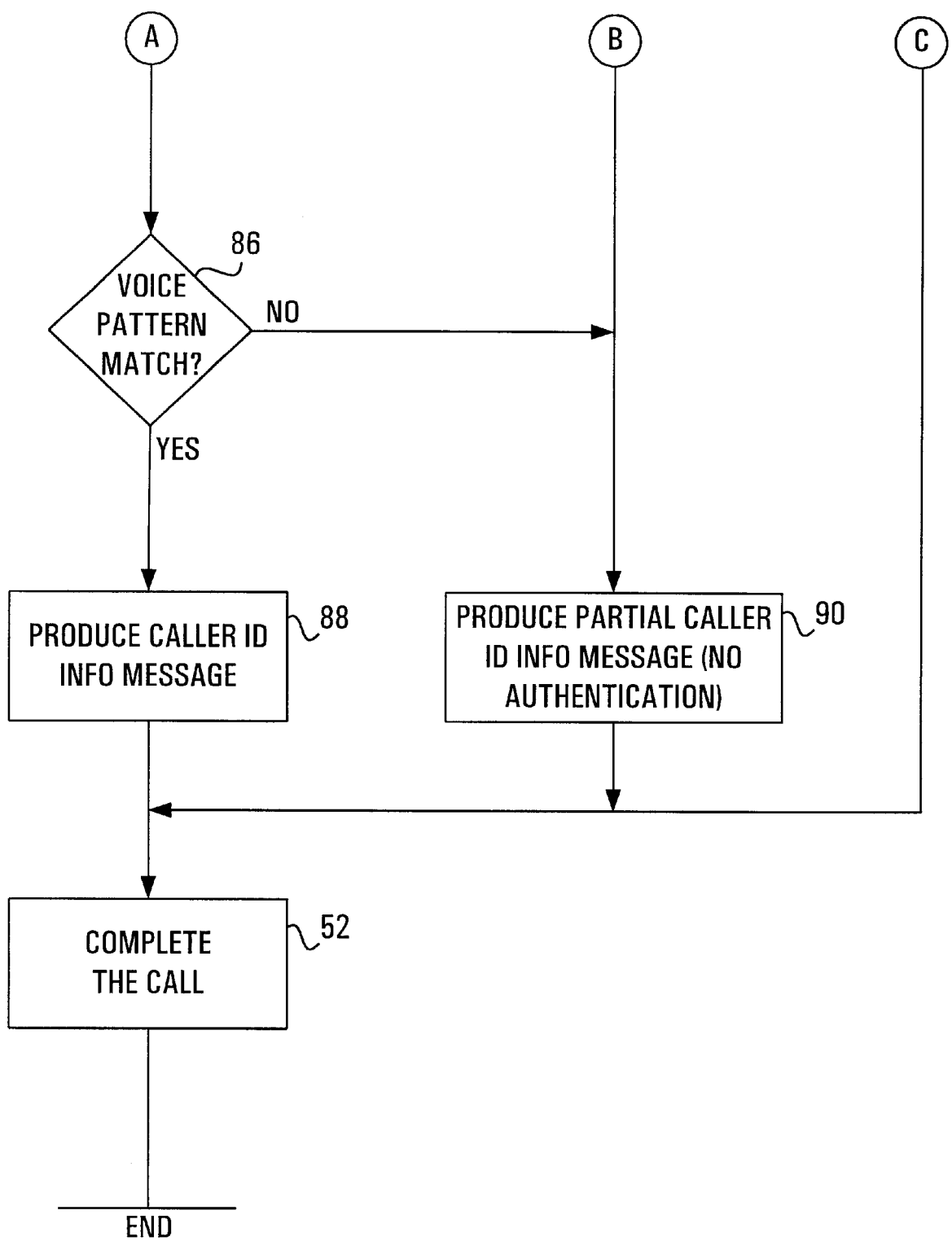

Referring to FIGS. 1 and 2B, after generating a new calling party record, the authenticating processor 36 is directed to block 52 which issues a message to the call processor 28 to complete the call without providing an authentication signal, instead, only calling line identification information is provided in the usual manner by transmitting FSK encoded signals to the called party. Thus, at least some identifying information about the calling party is provided to the called party.

Referring back to FIGS. 1, 2A and 2B, if at block 68, a calling party database record 72 is located, block 86 directs the authenticating processor 36 to function as a voice recognizer, or more specifically as a speaker recognizer, and to perform speaker recognition analysis by producing a voice profile for the utterance made by the calling party and comparing the voice profile of such utterance with the voice profile of the contents of the voice print field 78 of the calling party database record 72. The authenticating processor thus acts as a detector for detecting an intrinsic property, in this embodiment a voice profile, of the calling party.

The authenticating processor acts as a speaker recognizer for recognizing the calling party as a particular speaker by comparing the voice utterance to the voice profiles and the authenticating processor is programmed to provide authentication of the calling party in response to recognizing the calling party. If the voice profile of the utterance matches the voice profile of a calling party database record, in other words, if the spectral content and smoothness characteristics are a sufficiently close match, the speaker is recognized and authentication is deemed to have occurred. The authenticating processor thus acts to authenticate the identity of the calling party, based on the intrinsic property detected in the calling party's utterance.

Alternatively, the authenticating processor may require a confirmed match of both the intrinsic property and the calling line identification information to authenticate the identity of the calling party.

Block 88 then directs the authenticating processor 36 to produce a caller ID information message 61. The caller ID information message includes the contents of the calling line identification field 76, the contents of the customer public information field 80 and the contents of the subscriber-specific customer information field 81. The contents of the subscriber specific customer information field may be rather large, including for example customer information specifically of interest to the subscriber such as social insurance number, make of car, etc., for example. The caller ID information message 61 so produced is sent to the call processor 28 on the common messaging bus 30. The authenticating processor 36 is then directed to block 52, which directs the call processor 28 to complete the call.

The call processor 28 completes the call in the normal manner by activating the appropriate line controller to establish a connection to a called party customer premises equipment 16 to establish communications between the called party and the calling party. Before, during or after the ringing phase of the call, the call processor 28 transmits codes to the line controller associated with the called party customer premises equipment 16 to produce a frequency shift keyed (FSK) modulated signal which is receivable by the called party customer premises equipment 16. Thus, the line controller acts as a transmitter for transmitting the authentication signal to the called party as an encoded signal representing information associated with the calling party. The FSK signal acts as an authentication signal indicating authentication of the calling party and may be formatted in the multi-data messaging format (MDMF) or the ADSI data messaging format, for example, for transmission to the called party customer premises equipment 16. This authentication signal is only produced in response to the authentication of the calling party identity. The authenticating signal may simply indicate authentication or not by simple transmission of a "YES" or "NO" indication, but preferably it includes at least some calling party information obtained from the located record in the information database. The information contained within the FSK signal may then be displayed on a display at the called party customer premises equipment 16 or may be transferred to a computer connected to the called party customer premises equipment 16 for display, for example.

Referring back to FIG. 2B, if at block 86, the voice print of the caller reply message 60 and the contents of the voice print field 78 do not match, block 90 directs the authenticating processor 36 to produce a partial caller ID information message indicating that there was no voice profile match and that the calling party's identity could not be authenticated. The authenticating processor 36 then sends this message to the call processor 28 on the common messaging bus 30.

Block 52 then directs the authenticating processor 36 to send a complete call message to the call processor 28 which sends an FSK message to the called party as described above, with calling line identification information but no authentication signal, as no voice profile match was obtained.

If an FSK message including calling party identification information, such as calling party identity, is received at the called party customer premises equipment 16, such information may be used for display on a computer or may be used to route a call by a private branch exchange (PBX) of the called party or by a central office to which the called party is connected, for example.

To achieve call routing at a central office, the central office is provided with an Automatic Call Direction (ACD) system 92. Such systems conventionally respond to caller-supplied DTMF signals however, in this embodiment, the ACD system is reconfigured to respond to the contents of the caller id message 61 in place of or in addition to user-supplied DTMF signals to route calls. Consequently, calls are routed in response to the customer information obtained in response to authentication.

Alternatively, the ACD system 92 may be external to the central office, located at a customer PBX, for example. In this case, the ACD system is reconfigured to receive the authentication signal sent by the central office, to extract the customer information therefrom and to respond to the contents of the caller id message 61 in place of or in addition to user-supplied DTMF signals to route calls. Consequently, calls are routed in response to the authentication signal.

The foregoing description has assumed that the calling party customer premises equipment 14 and called party customer premises equipment 16 are connected to a common central office 12. The system and method herein will also work where the calling party customer premises equipment 17 and the called party customer premises equipment 16 do not share a central office.

Referring to FIG. 1, where a second calling party 21 and the called party 19 are served by different central offices, the subscriber database 42 and the calling party information database 70 are located at the central office 12 which serves the called party. In operation, the called party's central office 12 may receive the calling party's calling line identification information and the dialled telephone number from the calling party's central office 13 via an SS7 data-link (not shown) and the calling party's utterance along the trunk line 23. The called party's central office 12 uses this information to perform the calling party identification method described above.

While specific embodiments of the invention have been described and illustrated, such embodiments should be considered illustrative of the invention only and not as limiting the invention as construed in accordance with the accompanying claims.

What is claimed is:

1. A method of providing a called party with calling party authentication, comprising:
   a) detecting an intrinsic property of said calling party;
   b) authenticating the identity of said calling party, based on said intrinsic property; and
   c) providing an authentication signal to said called party in response to authentication of said calling party.

2. A method as claimed in claim 1 further including accessing an information database of calling party information in response to authentication of the identity of said calling party.

3. A method as claimed in claim 2 further including representing at least some of said calling party information in said authentication signal.

4. A method as claimed in claim 3 wherein providing said authentication signal includes transmitting to said called party, encoded signals representing information associated with said calling party.

5. A method as claimed in claim 2 further including searching a database of intrinsic property profiles associated with respective said calling party information to locate an intrinsic property profile matching said intrinsic property of said caller.

6. A method as claimed in claim 5 further including searching voice profiles in said database of intrinsic property profiles.

7. A method as claimed in claim 6 further including receiving a voice utterance from said calling party.

8. A method as claimed in claim 7 further including employing a speaker recognizer for comparing said voice utterance to said voice profiles to recognize said calling party as a particular speaker.

9. A method as claimed in claim 8 wherein authentication of said calling party is provided in response to recognizing said calling party.

10. A method as claimed in claim 9 further including recognizing speech provided by said calling party prior to authenticating the identity of said calling party.

11. A method as claimed in claim 10 further including locating information relating to said calling party in response to speech recognized by said speech recognizer.

12. A method as claimed in claim 1 further including receiving a password from said calling party and searching said information database for said password.

13. A method as claimed in claim 1 further including detecting calling line identification of said calling party.

14. A method as claimed in claim 13 wherein authenticating includes authenticating the identity of said calling party on the basis of said intrinsic property and said calling line identification information.

15. A method as claimed in claim 1 further including establishing communications between said called party and said calling party.

16. A method as claimed in claim 15 further including establishing communications between said calling party and an intermediary between said calling party and said called party.

17. A method as claimed in claim 16 further including intercepting the establishment of a communications link between said calling party and said called party.

18. A method as claimed in claim 1 further including routing a call made by said calling party in response to authentication of the identity of said party.

19. A method as claimed in claim 2 further including routing a call made by said calling party in response to said calling party information.

20. A method as claimed in claim 1 further including routing a call made by said calling party in response to said authentication signal.

21. A system for providing a called party with calling party authentication, comprising:
   a) a detector for detecting an intrinsic property of said calling party;
   b) an authenticating processor for authenticating the identity of said calling party, based on said intrinsic property; and
   c) a signal generator for generating an authentication signal for said called party in response to authentication of said calling party.

22. A system as claimed in claim 21 further including an information database of calling party information accessible by said authenticating processor.

23. A system as claimed in claim 22 wherein said signal generator is operable to represent at least some of said calling party information in said authentication signal.

24. A system as claimed in claim 23 further including a transmitter for transmitting said authentication signal to said called party as an encoded signal representing information associated with said calling party.

25. A system as claimed in claim 22 further including a database of intrinsic property profiles associated with respective said calling party information, said database of intrinsic property profiles being searchable by said authenticating processor.

26. A system as claimed in claim 25 wherein said intrinsic property profiles include voice profiles.

27. A system as claimed in claim 26 wherein said detector is operable to receive a voice utterance from said calling party.

28. A system as claimed in claim 27 wherein said authenticating processor includes a speaker recognizer for recognizing said calling party as a particular speaker by comparing said voice utterance to said voice profiles.

29. A system as claimed in claim 28 wherein said authenticating processor is programmed to provide authentication of said calling party in response to recognizing said calling party.

30. A system as claimed in claim 29 wherein said authenticating processor includes a speech recognizer for recognizing speech provided by said calling party prior to authenticating the identity of said calling party.

31. A system as claimed in claim 30 wherein said authenticating processor is programmed to locate information relating to said calling party in response to speech recognized by said speech recognizer.

32. A system as claimed in claim 21 wherein said detector is operable to receive a password from said calling party and said authenticating processor is operable to search said information database for said password.

33. A system as claimed in claim 21 further including a calling line identification information detector for detecting calling line identification of said calling party.

34. A system as claimed in claim 33 wherein said authenticating processor is programmed to authenticate the identity of said calling party on the basis of said intrinsic property and said calling line identification information.

35. A system as claimed in claim 21 further including a call processor for establishing communications between said called party and said calling party.

36. A system as claimed in claim 35 wherein said call processor is operable to establish communications between said calling party and an intermediary between said calling party and said called party.

37. A system as claimed in claim 36 wherein said intermediary includes said authenticating processor.

38. A system as claimed in claim 36 wherein said authenticating processor is programmed to intercept the establishment of a communications link between said calling party and said called party.

39. A system as claimed in claim 18 further including an automatic call direction system responsive to said authentication signal for routing a call made by said calling party in response to said authentication signal.

* * * * *